Jan. 20, 1931.  H. T. MELLING  1,789,340
TRANSPORT VALVE
Filed Dec. 12, 1928   2 Sheets-Sheet 1

INVENTOR
*Herbert Tom Melling,*
BY
*Frederick Greitenfeld*
ATTORNEY

Jan. 20, 1931.   H. T. MELLING   1,789,340
TRANSPORT VALVE
Filed Dec. 12, 1928   2 Sheets-Sheet 2
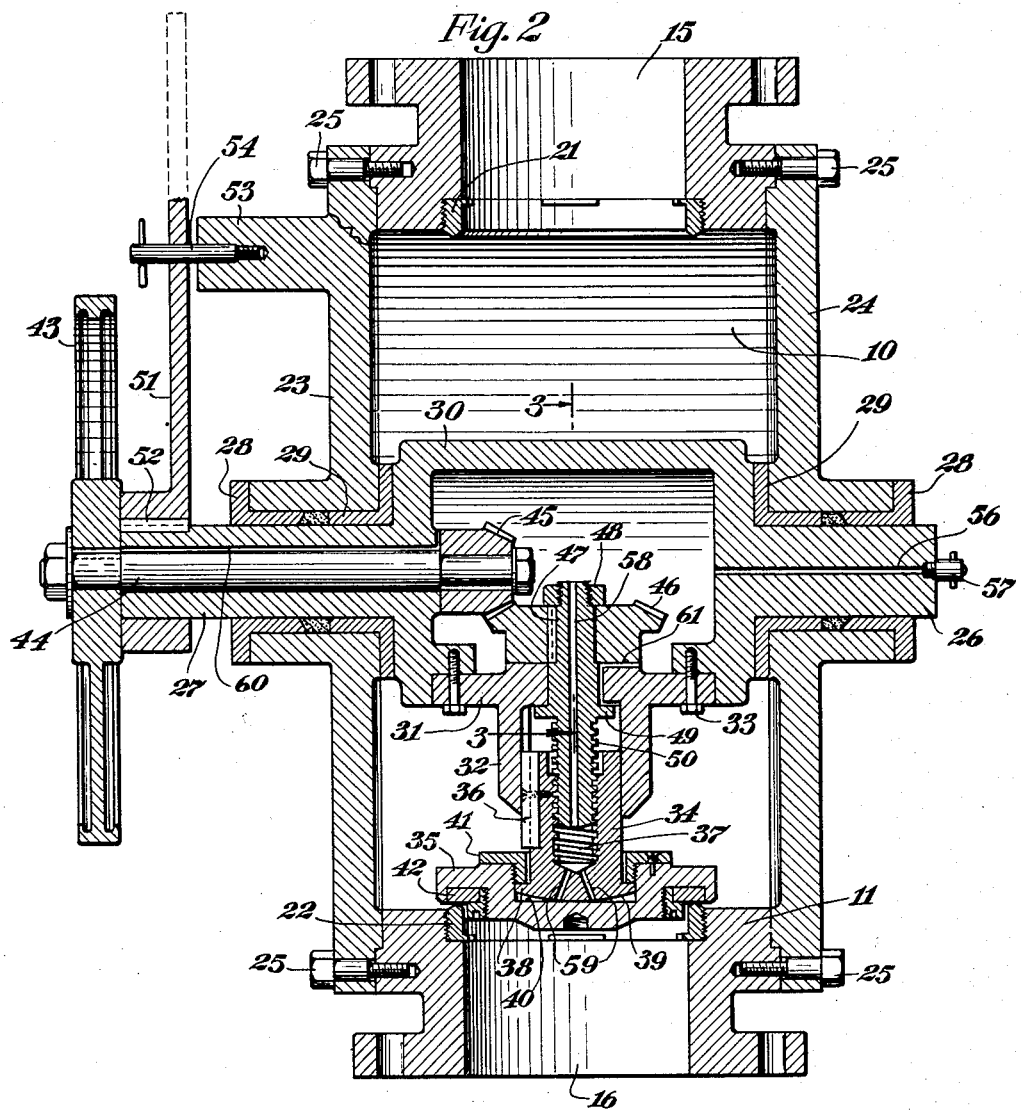
INVENTOR
*Herbert Tom Melling,*
BY
*Frederick Breitenfeld*
ATTORNEY Patented Jan. 20, 1931

1,789,340

UNITED STATES PATENT OFFICE

HERBERT TOM MELLING, OF NEW YORK, N. Y.

TRANSPORT VALVE

Application filed December 12, 1928. Serial No. 325,501.

My present invention relates generally to valves, and has particular reference to an improved transport valve designed primarily for pulverized material such as powdered coal.

This application covers certain improvements in the type of valve disclosed in my copending application filed June 11, 1927, under Serial No. 198,030, which matured into a patent on November 4, 1930, under No. 1,780,562.

Although certain phases of my invention are not limited to any specific application, I have illustrated the same, both in my previous application and herein, as applied to a transport valve having a single inlet opening and a pair of outlet openings, such valve being designed for employment in a plant where pulverized coal is transmitted from a main source into the valve through the inlet opening and is then selectively directed into one or another bin through one or the other outlet opening.

A general object of my improved transport valve, as set forth more generally in my copending application, is to provide a device which obviates most, if not all, of the disadvantages heretofore incident to the employment of valves wherein a mutual sliding is involved between a valve proper and the walls of the valve body. Briefly, my improved valve comprises a valve body having a trunnion rotatably mounted therein, a radially reciprocable valve in the body and carried by the trunnion, means for rotating the trunnion, and means for reciprocating the valve.

One of the problems which my improved construction presents is the proper lubrication of the mechanism for rotating the trunnion and for reciprocating the valve, and the simultaneous sealing of the operating mechanism and the moving parts of the device from the fine powdered material, such as coal dust, passing through the valve.

It is a general object of my present invention to provide improved means for effecting such lubrication and such sealing of the mechanism from the undesired effect of the powdered coal.

The essence of my improved type of valve lies in providing means whereby all frictional or sliding contact is avoided, and whereby a valve proper is raised or lowered with repect to a complementary valve seat. To achieve an efficient cooperation between the valve and any selected valve seat, I have provided a valve construction wherein a valve disc is pivotally associated with a valve stem so that the valve disc if free to adjust itself to the valve seat presented thereto. Such pivotal association was shown in my copending application and has been retained in my present device.

One of the features of my present device lies in providing means for efficiently lubricating the articulation between the valve disc and the valve stem.

A general object of my present invention is to provide efficient and simple means for providing lubricating material such as grease to all the essential parts within the valve, such supply being effected from the exterior of the valve body.

Another general object of my present invention is to improve the smooth operation of the valve to facilitate its initial manufacture, its assembly and its repair, and in general, to improve the reliability of its operation.

Thus, features of my present invention lie in providing a smoother unobstructed path for the powdered coal, a means for inexpensively constructing the valve initially, a means for facilitating access to interior parts for purposes of inspection or repair, and a means for locking a trunnion in any of several predetermined positions.

I achieve the foregoing objects and such other objects as may hereinafter appear or be pointed out in the manner illustratively exemplified in the accompanying drawings in which—

Figure 2 is a cross-sectional view taken substantially along the line 2—2 of Figure 1;

Figure 3 is a cross-sectional view taken substantially along the line 3—3 of Figure 2;

Figure 5 is a view similar to a portion of Figure 2, showing a modification.

Figure 1:
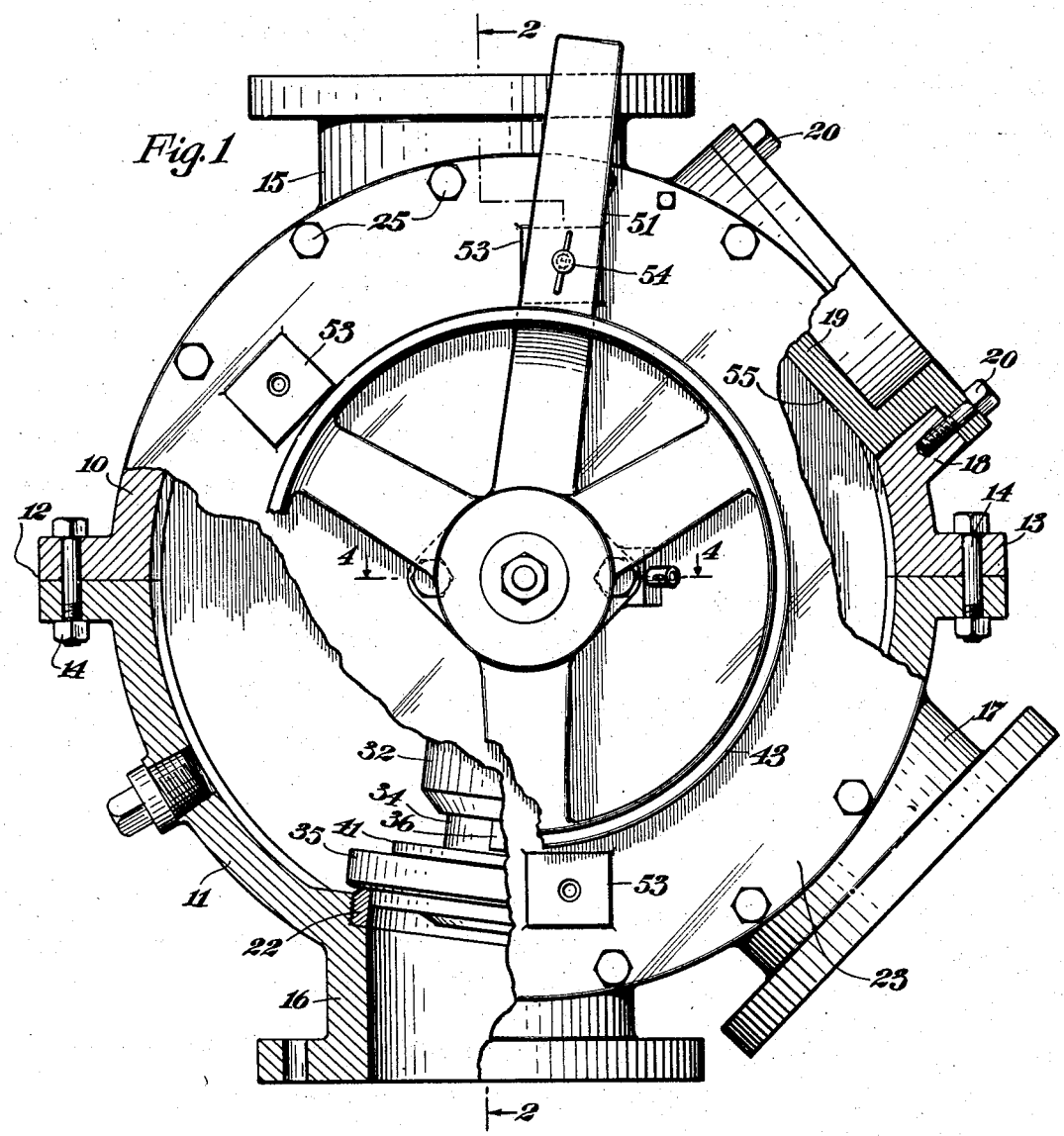
Figure 1 is a front elevational view of my valve with parts broken away and other parts in section.
Figure 4:
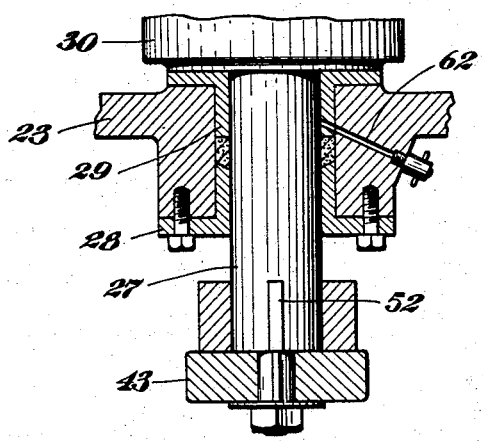
Figure 4 is a fragmentary cross-sectional view taken substantially along the line 4—4 of Figure 1.

The valve body consists of a cylindrical wall and a pair of opposite substantially circular side walls. In accordance with my present invention, the cylindrical wall is composed of two complementary arcuate sections 10 and 11 provided with opposed exterior flanges 12 and 13 whereby these sections may be separably attached to each other by studs or bolts 14, or by other suitable means exterior of the valve body.

In the illustrated embodiment, I have shown an inlet opening 15 formed upon the section 10 and I have shown two outlet openings 16 and 17 formed upon the section 11. Each of the inlet and outlet openings is provided with a suitable flange to permit attachment thereof to the outside piping. The inlet opening 15 has been shown substantially opposite the outlet opening 16, and the outlet openings 16 and 17 have been shown at approximately 45° to each other, but it will be obvious that certain phases of my invention are not limited to such a specific arrangement.

In accordance with my invention, I provide an additional opening 18 in the cylindrical wall, and I have shown this opening provided in the section 10 and between the openings 15 and 17. The purpose of the opening 18 will be presently described, but I will point out at this time that it is not provided with any attaching flange and is not designed to be associated with any external pipe. A removable cover plate 19 is suitably associated with the opening 18, preferably by means of studs 20, or the like.

In each of the inlet and outlet openings I have provided a valve seat which is preferably constructed as a separate element and then associated with the particular opening for which it is intended. The seats 21 and 22 of Figure 2, associated respectively with the openings 15 and 16, illustrate the general nature of these valve seats. I will point out at this time that the sectional construction of the cylindrical wall facilitates access to the inner ends of the openings 15 and 16 for purposes of initially applying the valve seats 21 and 22 or for subsequently gaining access to such valve seats for purposes of inspection or repair.

The cylindrical wall of the valve body is sandwiched between the two opposed side walls 23 and 24, which are separably assembled with the cylindrical wall sections by means of studs 25 or the like.

Journaled between the walls 23 and 24, and substantially along the axis of the cylindrical wall of the valve body, is a trunnion or spindle whose opposite ends both extend through the opposite side walls. Thus, the trunnion has an end 26 journaled in and extending through the wall 24 and an end 27 journaled in and extending through the wall 23. Suitable glands 28 and suitable brass bushings 29 or the like furnish an efficient journaling of the opposite trunnion ends.

The midportion 30 of the trunnion is hollow and of substantially cylindrical outer contour for a purpose presently to be described. Within this hollow midportion is mounted certain mechanism for controlling the reciprocation of the valve proper.

More specifically, upon reference to Figures 2 and 3, I will point out that the midportion 30 is flattened off at one side thereof to provide a suitable seat for an attaching flange 31 carried by a radial sleeve 32. This construction constitutes an improvement over the rectangular construction illustrated in my previous application, for various reasons. For example, the manufacture of the trunnion and its subsequent assembly with the radial sleeve 32 is greatly facilitated. The mere application of studs 33 or the like will secure the radial sleeve 32 in its proper position and will at the same time seal the hollow midportion 30 of the trunnion.

Non-rotatably but slidably mounted for reciprocable movement within the sleeve 32 is the valve which is composed of the valve stem 34 and the separate valve disc 35. The valve stem 34 is splined, as by a key 36, to the interior of the sleeve 32. The valve stem 34 is also provided with the internally threaded bore 37 and the enlarged head 38. The outer surface 39 of the head 38 is convex.

The valve disc 35 encircles the enlarged head 38 and presents a non-conforming rear surface to the convex forward surface 39. In the illustrated embodiment, this rear surface 40 is shown as a plane surface. The valve disc 35 is held in association with the valve stem 34 by means of the nut 41 threaded to the disc 35 and adapted to bear against the rear marginal edge of the enlarged head 38. The valve disc 35 is further provided with a replaceable ring or member 42 serving as the annular portion of the disc which cooperates directly with the valve seats.

The trunnion end 27 is longitudinally hollowed, and the mechanism for controlling the reciprocation of the valve includes the manually controllable hand-wheel 43 mounted upon the exterior end of a shaft 44 extending through the hollowed trunnion end 27 and carrying a beveled gear 45 at its inner end within the hollow midportion 30. The gear 45 meshes with a beveled gear 46 keyed to a shaft member 47 which extends downwardly into the sleeve 32. A nut 48, cooperating with a collar 49, serves to keep the gear 46 in proper position upon the member 47. The lower end of the member 47 is exteriorly threaded as at 50 for threaded cooperation with the internally threaded bore 37 of the valve stem 34.

The rotation of the trunnion is controlled by a lever 51 keyed as at 52 to an exterior portion of the trunnion end 27.

One of the features of my present invention lies in providing means for locking the trunnion in a selected predetermined position. For this purpose, I have provided a series of bored lugs 53 on the side wall 23 and I have provided a pin 54 adapted to pass through the lever 51 and engage within any selected bore of the lugs 53. The lugs 53 are so positioned with respect to the various openings in the cylindrical wall that when the lever 51 is locked in association with any selected lug 53, the sleeve 32, and the valve carried thereby, will be positioned accurately above a particular opening in the cylindrical wall. Thus, in Figures 1 and 2, the lever 51 is shown in locked association with one of the lugs 53, and it will be noted that the valve is thus accurately positioned and retained above the outlet opening 16.

With the lever 51 thus positioned, passage is afforded for the coal through the valve body from the inlet opening 15 to the outlet opening 17. This passage is an annular passage bounded on the outside by the inner cylindrical surface of the cylindrical wall of the body, and bounded on the inside by the cylindrical outer surface of the hollow midportion 30. It is to be noted that there are no substantial constrictions to this annular passage, and there are no angles or projecting portions upon which the powdered coal may accumulate or may be obstructed. This constitutes an added advantage of the cylindrical structural nature of the midportion 30 previously referred to.

If it is desired to open the outlet 16 and seal the outlet 17, the valve is first lifted from the seat 22, this being accomplished by rotating the hand-wheel 43. After the valve is entirely clear of the valve seat 22, the lever 51 is disassociated from its present lug 53 and is swung to the left (in Figure 1) to the adjacent lug 53 to which it is then locked. During this movement, no objectionable sliding movement has taken place between any of the parts of the valve. By then turning the hand-wheel 43 in the opposite direction, the valve will be brought down upon the valve seat in the opening 17. As the valve is brought down, it will adjust itself to an accurate cooperating fit with such valve seat, this adjustment being possible by the pivotal association of the valve disc 35 with the valve stem 34. Again, no objectionable sliding has occurred, whereas the opening 17 will have been efficiently and satisfactorily sealed.

The purpose of the additional opening 18 is to permit access to the valve for purposes of inspection or repair without disassembling the entire device. Under ordinary conditions, the removable cover 19 has an inner surface 55 which forms a substantial continuation of the inner cylindrical surface of the valve body, thus maintaining a smooth passage for the powdered material. If the valve is to be inspected or possibly removed, the lever 51 is swung over the corresponding lug 53, the cover 19 is removed, and a rotation of the wheel 43 will thereupon advance the valve outwardly along the axis of the opening 18. One of the features of my invention lies in providing the opening 18 of a diameter sufficiently large to permit the entire valve to be forced outwardly through the opening 18. When this has been accomplished, the entire valve may be disassembled or repaired with great ease and thereafter replaced in a similarly efficient manner.

I shall now describe the improved means for lubricating the working parts and for sealing such parts from the action of the powdered material.

I have shown a longitudinal bore 56 extending through the trunnion end 26 from the exposed exterior end thereof to the interior of the hollow midportion 30. A removable plug 57 or a high-pressure grease connection fitting normally keeps this bore closed. I have also shown a longitudinal bore 58 extending through the member 47 from the interior of the midportion 30 to the lower end of the internally threaded bore 37 of the valve stem 34. I have also shown a pair of bores 59 extending from the lower end of the bore 37 to the surface 39, i. e., to the space between such surface and the rear surface 40.

If grease is forced through the bore 56, it will not only fill the interior of the midportion 30, thereby lubricating all necessary parts, but it will also find its way through the bore 58 and the bores 59 to the space between the surfaces 39 and 40, from which space it will work its way outwardly into the clearance space between the nut 41 and the valve stem 34. These spaces are advantageously kept clear of powdered material and filled with grease, for reasons which will be obvious. Any grease working its way outwardly through the cracks between the several parts will serve to seal the interior mechanism described from the objectionable action of the powdered material.

My improved lubrication system further includes a groove 60 provided between the shaft 44 and the inner wall of the hollow trunnion end 27, and a set of grooves 61 extending beneath the gear 46 from the interior of the midportion 30 down into the upper portion of the sleeve 32. Further, a feed bore or bores 62 is advantageously associated with each side wall of the valve to permit lubricating material to be forced onto the outer surfaces of the trunnion ends.

In Figure 5, I have shown a modification wherein a rearwardly extending skirt is provided upon the valve disc 35. More specifically, I have shown a skirt 63 integrally formed upon the nut 41. The skirt 63 extends rearwardly and encircles the sleeve 32. Between the latter and the skirt 63 is a resilient annular element 64, such as an ordinary piston ring. Such ring provides sufficient clearance for purposes of enabling the valve to adjust itself as previously described, and at the same time it efficiently seals the space between the skirt 63 and the sleeve 32.

In this modified form, I provide additional grooves 65 extending from the lower portion of the bore 37 into the space just referred to, so that lubricating material passing downwardly through the bore 58 will find its way laterally into the space between the valve stem and the skirt 63. This construction has proven highly satisfactory from the standpoint of enhancing the seal between the undesirable powdered material and the working parts of the device.

In certain cases, I find it advisable to mount a protective sheath of relatively strong metal, such as steel, around the midportion of the trunnion. I have not shown such sheaths, but mention the employment thereof for purposes of illustrating the type of changes and modifications which those skilled in the art may achieve without departing from the spirit and scope of the invention as expressed in the appended claims. Such a sheath would protect the trunnion surface from the wearing action of the powdered material, while it would not materially add to the expense of manufacture.

In general, I do not mean to limit myself to the specific details of construction herein illustrated and described for the purpose of explaining the nature of my invention. Therefore, such details, where they appear in the appended claims, are to be interpreted as illustrative, and not in a limiting sense, unless the prior art should require a different interpretation.

Having thus described my invention and illustrated its use, what I claim as new and desire to secure by Letters Patent is—

1. In a transport valve, a valve body, a trunnion rotatably mounted therein, a radially reciprocable valve carried by said trunnion; said valve including a valve stem having an enlarged end, the outer surface of said end being convex, and a valve disc enclosing said end and presenting a non-conforming surface to said convex surface, and means for supplying lubricating material from the outside of the valve body to the space between said surfaces.

2. In a transport valve, a valve body, a trunnion rotatably mounted therein, a radially reciprocable valve carried by said trunnion; said valve including a valve stem having an enlarged end, the outer surface of said end being convex, and a valve disc enclosing said end and presenting a non-conforming surface to said convex surface; said trunnion and valve stem being provided with bores extending from the exterior of the valve body to the space between said surfaces, whereby lubricating material may be forced into said space.

3. In a transport valve, a valve body, a trunnion rotatably mounted therein, a radially reciprocable valve carried by said trunnion; said valve including a valve stem having an enlarged end, and a valve disc enclosing said end, said end having an outer surface bearing against a rear surface of said disc, at least one of said surfaces being convex and the other surface not conforming thereto; and means for supplying lubricating material from the exterior of the valve body through said trunnion and valve stem to the space between said surfaces.

4. In a transport valve, a valve body, a trunnion rotatably mounted therein and having an end projecting from a wall of said body, said trunnion having a hollow midportion, a radial sleeve carried by said midportion, and a radially reciprocable valve carried by said trunnion; said valve comprising a valve stem in said sleeve, an enlarged end on said stem and having a convex outer surface, and a valve disc enclosing said enlarged end; and means for supplying lubricating material through said projecting trunnion end to the interior of said midportion and of said sleeve and to said convex surface.

5. In a transport valve, a valve body, a trunnion rotatably mounted therein, a radial sleeve carried by said trunnion, and a radially reciprocable valve including a valve stem in said sleeve and a valve disc at the end of said stem; said disc being provided with a rearwardly disposed skirt encircling said sleeve, and a resilient annular element interposed between said sleeve and said skirt.

6. In a transport valve, a valve body, a trunnion rotatably mounted therein, a radial sleeve carried by said trunnion, and a radially reciprocable valve including a valve stem in said sleeve and a valve disc at the end of said stem, said disc being provided with a rearwardly disposed skirt encircling said sleeve, and means for supplying lubricating material from the exterior of the valve body to the space between the valve stem and said skirt.

7. In a transport valve, a valve body, a trunnion rotatably mounted therein and having a hollow midportion and a lubrication bore extending from a trunnion end to said midportion, a radial sleeve carried by said midportion, a radially reciprocable valve mounted in said sleeve and including an internally threaded valve stem, mechanism in said midportion for reciprocating said valve, said mechanism including a threaded member extending into said sleeve and into engagement with said valve stem, said member having a longitudinal lubrication bore, and a valve disc pivotally carried by the end of the valve stem and including a skirt extending rearwardly to encircle said sleeve; said valve stem having lubrication bores communicating between the threaded interior of the stem and the interior of said skirt.

In witness whereof I have signed this specification this 24 day of November, 1928.

HERBERT TOM MELLING.